(12) United States Patent
Zhou et al.

(10) Patent No.: US 12,145,870 B2
(45) Date of Patent: Nov. 19, 2024

(54) SYSTEMS AND METHODS FOR DISINFECTING FLUIDS

(71) Applicant: Georgia Tech Research Corporation, Atlanta, GA (US)

(72) Inventors: Jianfeng Zhou, Atlanta, GA (US); Xing Xie, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 590 days.

(21) Appl. No.: 16/782,430

(22) Filed: Feb. 5, 2020

(65) Prior Publication Data

US 2020/0247695 A1   Aug. 6, 2020

Related U.S. Application Data

(60) Provisional application No. 62/801,176, filed on Feb. 5, 2019.

(51) Int. Cl.
*C02F 1/461* (2023.01)
*C02F 101/30* (2006.01)

(52) U.S. Cl.
CPC .............. *C02F 1/46109* (2013.01); *C02F 2001/46133* (2013.01); *C02F 2001/46171* (2013.01); *C02F 2101/30* (2013.01); *C02F 2201/46105* (2013.01); *C02F 2303/04* (2013.01)

(58) Field of Classification Search
CPC ........ C02F 2001/46171; C02F 1/46109; C02F 2001/46133; C02F 2101/30; C02F 2201/46105; C02F 2303/04
See application file for complete search history.

(56) References Cited

U.S. PATENT DOCUMENTS

| | | | | |
|---|---|---|---|---|
| 9,512,018 B1* | 12/2016 | Kolls | ................... | C02F 1/46104 |
| 2010/0001418 A1* | 1/2010 | Hirakui | ..................... | C02F 1/78 |
| | | | | 261/35 |
| 2011/0259747 A1* | 10/2011 | Cui | ..................... | C02F 1/46109 |
| | | | | 204/674 |

FOREIGN PATENT DOCUMENTS

CN         105540771 A  *  5/2016    ............... C02F 1/48

* cited by examiner

*Primary Examiner* — Ciel P Contreras
(74) *Attorney, Agent, or Firm* — Troutman Pepper Hamilton Sanders LLP; Ryan A. Schneider; Korbin M. Blunck

(57) ABSTRACT

An exemplary embodiment of the present invention provides a system for disinfecting a fluid, the system comprising: an outer electrode defining an internal cavity; a center electrode comprising a plurality of surface area members, the center electrode positioned within the internal cavity and extending along at least a portion of a longitudinal axis of the outer electrode; an inlet positioned proximate a first end of the outer electrode and configured to allow a fluid to pass from an area external to the cavity into the cavity; and an outlet positioned proximate a second end of the outer electrode and configured to allow the fluid to pass from the cavity into an area external to the cavity. A voltage supply can be configured to supply a voltage across the outer electrode and center electrode, the voltage generating a non-uniform electric field distribution on a cross-sectional plane of the system.

17 Claims, 13 Drawing Sheets

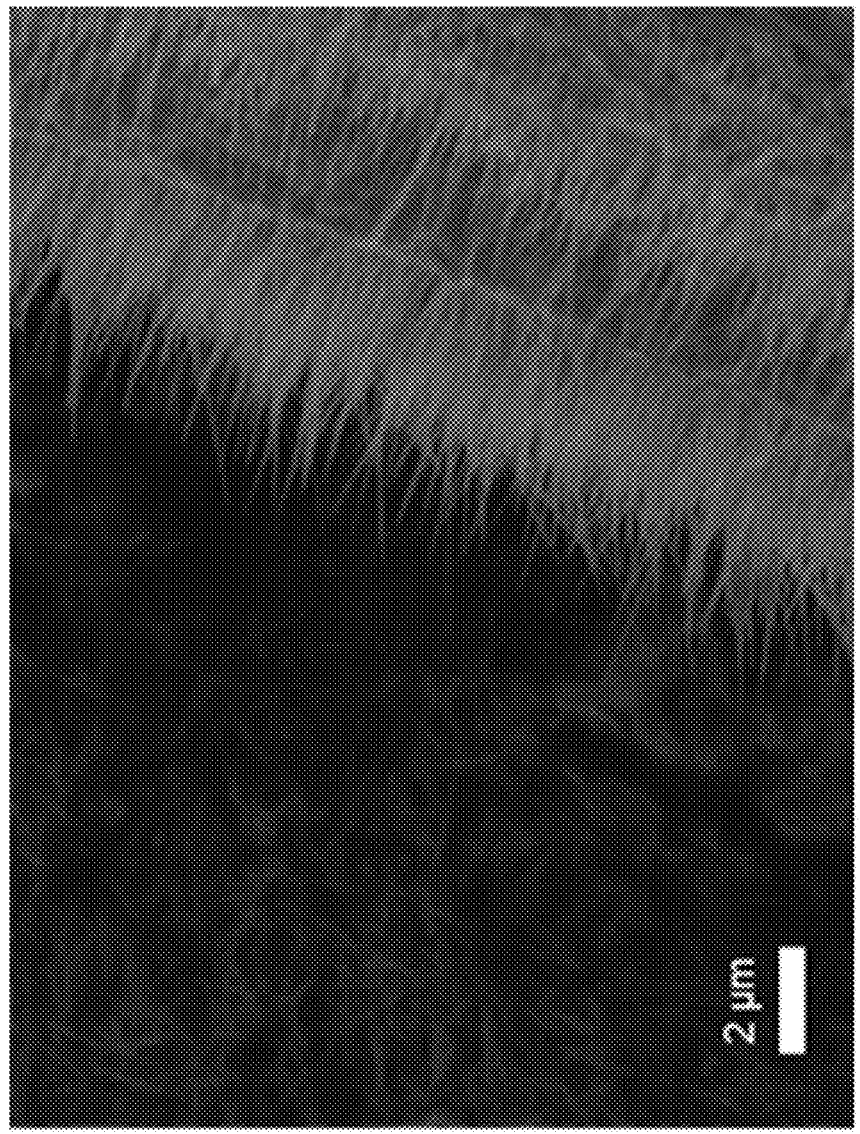

SYSTEMS AND METHODS FOR DISINFECTING FLUIDS

CROSS-REFERENCE TO RELATED APPLICATIONS

This application claims the benefit of U.S. Provisional Application Ser. No. 62/801,176, filed on 5 Feb. 2019, the entire contents and substance of which is incorporated herein by reference in its entirety as if fully set forth below.

STATEMENT OF RIGHTS UNDER FEDERALLY SPONSORED RESEARCH

This invention was made with government support under Grant No. 1845354 awarded by the National Science Foundation. The government has certain rights in the invention.

TECHNICAL FIELD OF THE INVENTION

The various embodiments of the present disclosure relate generally to systems and methods for disinfecting fluids.

BACKGROUND OF THE INVENTION

Disinfection is essential to protect human from pathogenic infection. A drinking water system for developed urban areas typically contains primary and secondary disinfection phases. The primary disinfection inactivates or removes pathogens in a centralized unit (e.g., a treatment plant), while the secondary disinfection refers to maintaining microbicidal effects in the distribution systems (e.g., pipelines). The most popular disinfection method is chlorination attributed not only to its low cost and high primary disinfection efficiency, but also to its capability of providing secondary disinfection effect via the remaining free chlorine and/or chloramines. Nevertheless, chlorination and chloramination inevitably generate carcinogenic disinfection by-products that threaten human health. This problem can be solved by using non-chlorine-based techniques such as ultraviolet (UV) or membrane filtration. With the accumulation of technology development and industrial experiences, these alternative techniques have become more robust and cost-effective, showing great potential to substitute chlorination in centralized water facilities. However, none of these methods produce residual antimicrobial power. Microbial regrowth in pipelines becomes the major obstacle against the adoption of UV, ozonation, and membrane filtration in centralized water treatment facilities. Therefore, disinfection technologies are urgently needed to provide continuous antimicrobial effect throughout the water distribution system.

Therefore, there is a desire for improved systems and methods for disinfecting water. Various embodiments of the present invention address these desires.

BRIEF SUMMARY OF THE INVENTION

The present invention relates to systems and methods for disinfecting a fluid.

An exemplary embodiment of the present invention provides a system for disinfecting a fluid. The system can comprise: an outer electrode defining an internal cavity; a center electrode comprising a plurality of surface area members, the center electrode positioned within the internal cavity and extending along at least a portion of a longitudinal axis of the outer electrode; an inlet positioned proximate a first end of the outer electrode and configured to allow a fluid to pass from an area external to the cavity into the cavity; and an outlet positioned proximate a second end of the outer electrode and configured to allow the fluid to pass from the cavity into an area external to the cavity.

In any of the embodiments disclosed herein, the plurality of surface area members can comprise nanowires.

In any of the embodiments disclosed herein, the outer electrode and the center electrode can be cylindrically shaped.

In any of the embodiments disclosed herein, the system can further comprise a voltage supply configured to supply a voltage across the outer electrode and center electrode, the voltage generating a non-uniform electric field distribution on a cross-sectional plane of the system.

In any of the embodiments disclosed herein, the voltage can be from 1V to 2V applied across the center electrode and outer electrode, and a fluid can be permitted to flow through the internal cavity with a hydraulic retention time of about ten minutes. The system can also be configured to reduce a living contaminant in the fluid at an inactivation efficiency from log 5 to log 7.

In any of the embodiments disclosed herein, the inactivation efficiency can be about log 6.

In any of the embodiments disclosed herein, the outer electrode and the center electrode comprise a metal.

In any of the embodiments disclosed herein, the center electrode can have a diameter of between 50 μm and 100 μm.

In any of the embodiments disclosed herein, the center electrode can have a diameter of between 70 μm and 80 μm.

Another embodiment provides a method for disinfecting a fluid. The method can comprise providing a fluid disinfection system, comprising: an outer electrode defining an internal cavity; a center electrode comprising a plurality of surface area members, the center electrode positioned within the internal cavity and extending along at least a portion of a longitudinal axis of the outer electrode; an inlet positioned proximate a first end of the outer electrode and in fluid communication with the internal cavity; and an outlet positioned proximate a second end of the outer electrode and in fluid communication with the internal cavity; causing a fluid to flow through the inlet and into the internal cavity, the fluid comprising at least one living contaminant at a first concentration upon entering the inlet; applying a voltage across the center electrode and the outer electrode; and causing the fluid to flow through the internal cavity and out of the outlet, wherein a second concentration of the living contaminant upon exiting the outlet is less than the first concentration.

In any of the embodiments disclosed herein, the plurality of surface area members can comprise nanowires.

In any of the embodiments disclosed herein, the outer electrode and the center electrode can be cylindrically shaped.

In any of the embodiments disclosed herein, the outer electrode and the center electrode comprise a metal.

In any of the embodiments disclosed herein, applying a voltage across the center electrode and the outer electrode can generate a non-uniform electric field distribution on a cross-sectional plane of the system.

In any of the embodiments disclosed herein, the voltage can be from 1V to 2V applied across the center electrode and outer electrode, and a fluid can be permitted to flow through the internal cavity with a hydraulic retention time of about ten minutes.

In any of the embodiments disclosed herein, the second concentration of the living contaminant can be reduced from the first concentration at an inactivation efficiency from log 5 to log 7.

In any of the embodiments disclosed herein, the inactivation efficiency can be about log 6.

Another embodiment provides a system for disinfecting a fluid. The system can comprise: an outer electrode defining an internal cavity; a center electrode positioned within the internal cavity and extending along at least a portion of a longitudinal axis of the outer electrode, the center electrode having a surface comprising a plurality of metallic nanowires; an inlet positioned proximate a first end of the outer electrode and configured to allow a fluid to pass from an area external to the cavity into the cavity; an outlet positioned proximate a second end of the outer electrode and configured to allow the fluid to pass from the cavity into an area external to the cavity; and a voltage supplier comprising a power generator, the power generator in communication with the fluid.

In any of the embodiments disclosed herein, the power generator can comprise a turbine electric generator, and the voltage supplier can be configured to receive energy from the power generator and supply a voltage across the outer electrode and center electrode. The voltage can generate a non-uniform electric field distribution on a cross-sectional plane of the system.

In any of the embodiments disclosed herein, the plurality of metallic nanowires can comprise copper.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

FIG. 4b illustrates another Scanning Electron Microscope (SEM) image of a center electrode in a system for disinfecting fluid in accordance with some embodiments of the present disclosure.

DETAILED DESCRIPTION OF THE INVENTION

Figure 1:
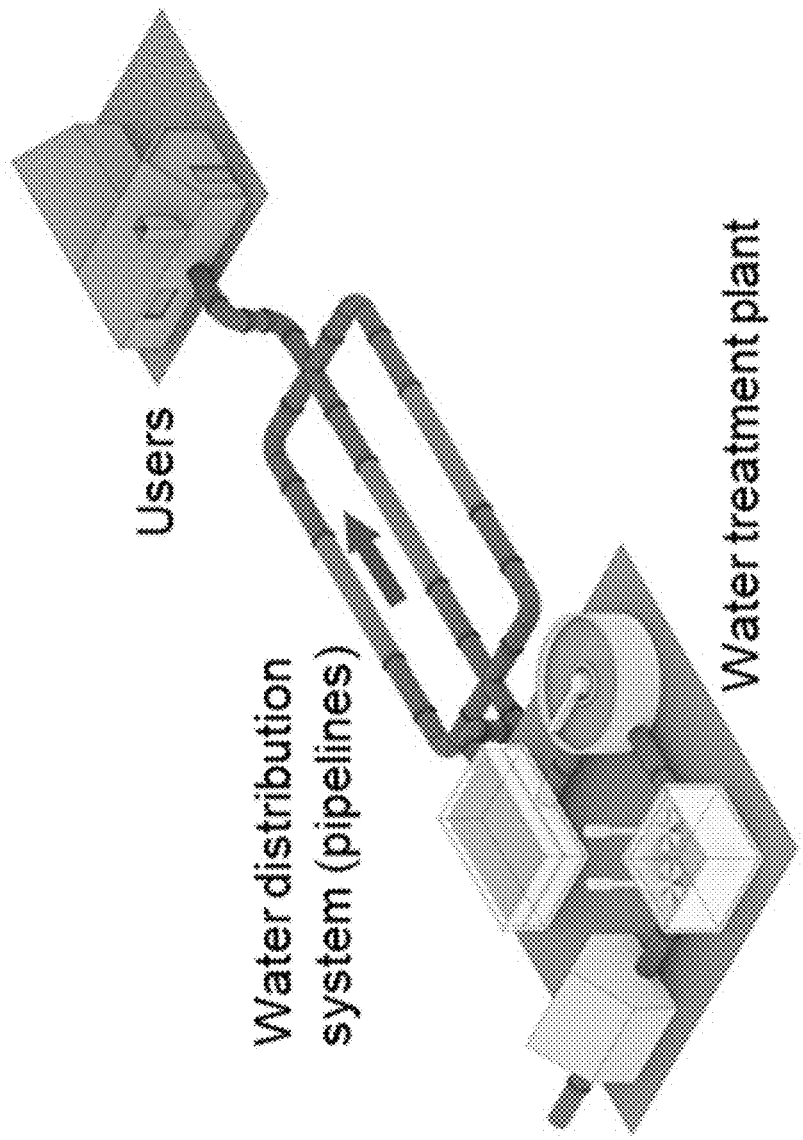
FIG. 1 illustrates a system for disinfecting fluid in a fluid system in accordance with the present disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Potential technologies can be easily incorporated into existing water distribution systems. In addition to being low cost, low energy consumption, and high efficiency, the purification technology should require as low maintenance as possible, considering that most of the pipelines are underground. Locally enhanced electric field treatment (LEEFT) has emerged as a promising water disinfection technique. When biological cells are exposed to a high-strength electric field, the permeability of the cell membrane dramatically increases, and electroporation may occur. When the strength of the external electric field reaches a sufficiently high level, the electroporated pores on the cell membrane become irreversible, resulting in cell inactivation. Traditionally, a high voltage can be applied to realize the high-strength electric field, leading to intensive energy consumption and operating risks. Such a problem can been resolved by the LEEFT with nanowire-modified electrodes. The nanowires can enhance the local electric field near the tips by several orders of magnitude, and thus enable pathogen inactivation with very low voltage applied. Taking advantage of this phenomenon, a series of nanowire-assisted electrodes can be developed, and LEEFT devices can achieved high inactivation of various bacteria and viruses. The energy consumption of the LEEFT can be as low as ~1 J/L, which is significantly lower than that of conventional electric field treatment (typically>150 kJ/L) and other aforementioned water disinfection processes (UV, 20-60 J/L; ozone, 50-100 J/L; membrane, 500-5000 J/L).

Figure 2:
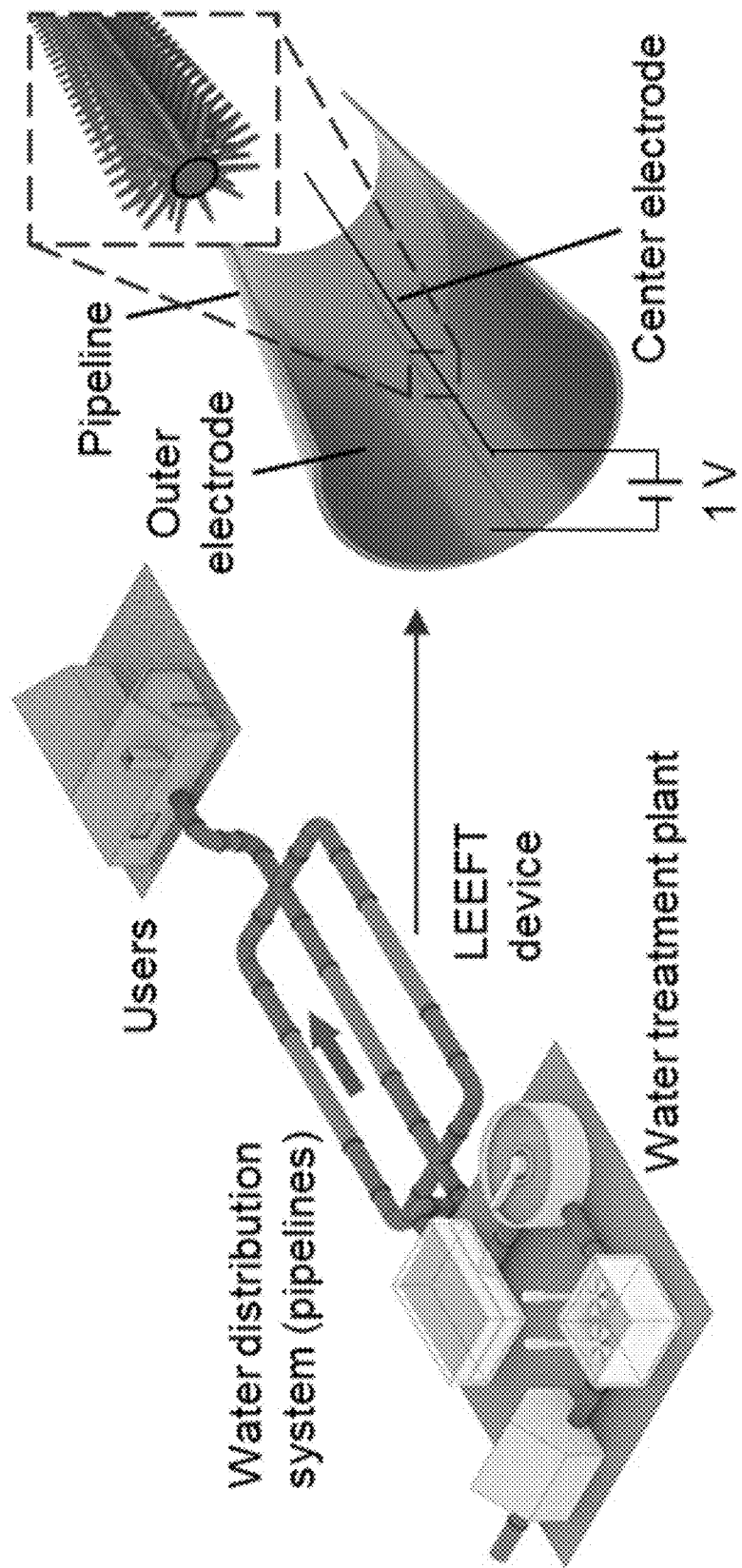
FIG. 2 illustrates an exploded view of a system for disinfecting fluid in accordance with some embodiments of the present disclosure.

The LEEFT can be applied in use for water disinfection in pipelines, as shown in FIG. 1. Compared with residual chlorine treatment, the LEEFT can be a chemical-free process and may not generate any disinfection by-products. In addition, there is no concern of over-treatment, because the LEEFT is primarily a physical process that has little impact on the physical and chemical property of the treated water. Disclosed herein are new LEEFT configurations with a cylindrical treatment chamber and coaxial electrodes: a tubular outer electrode and a nanowire-modified center electrode, as shown in FIG. 2. Such configurations can allow LEEFT devices to be directly adapted to current water distribution system as segments of the pipelines. When water is flowing through a LEEFT pipe, potentially existing pathogens can be sent towards the center electrode by various forces, such as hydrodynamic force, electrophoretic force, and dielectrophoretic force. Subsequently, the pathogens can be inactivated by irreversible electroporation due to the enhanced electric field near the tips of the nanowires, even though a low voltage is applied.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Figure 3A:
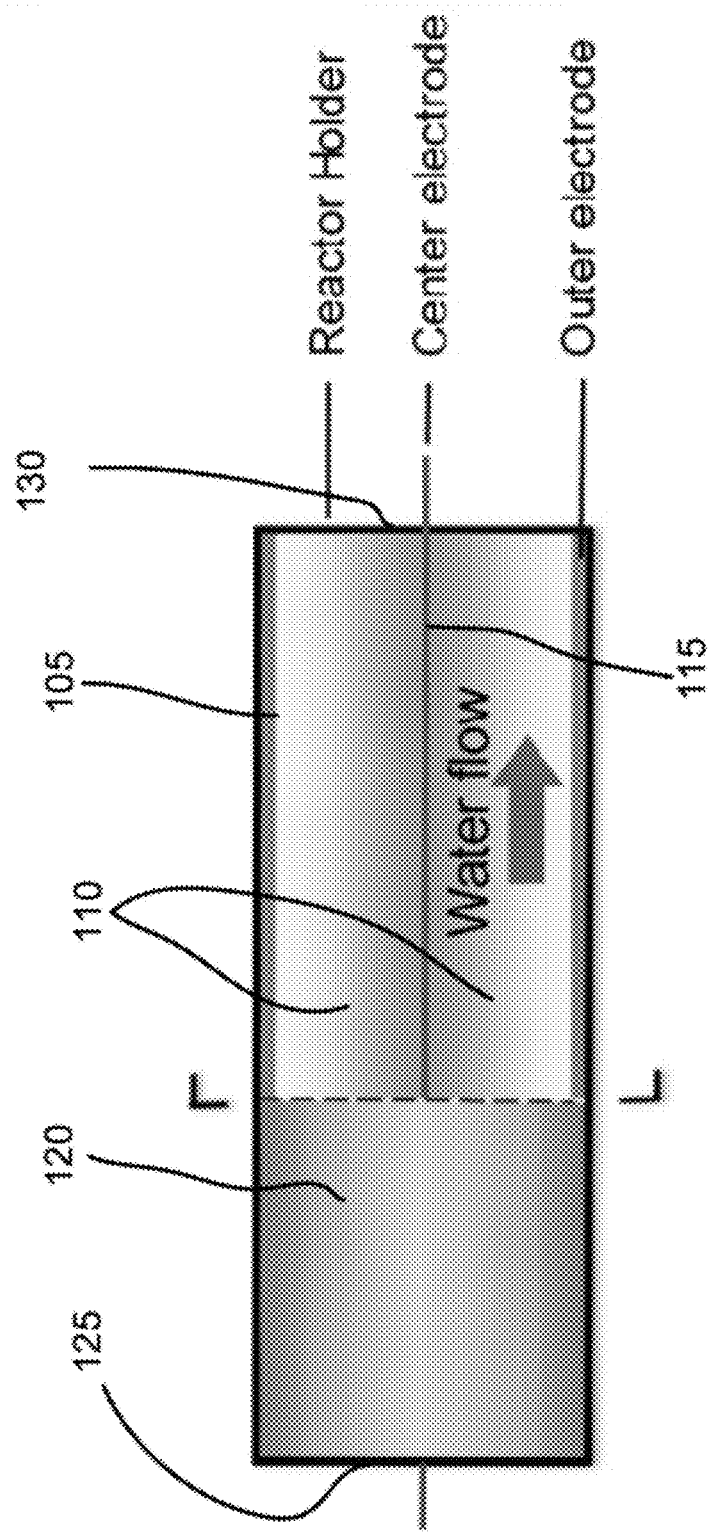
FIG. 3a illustrates a side cross-sectional view of a system for disinfecting fluid in accordance with some embodiments of the present disclosure.
Figure 3B:
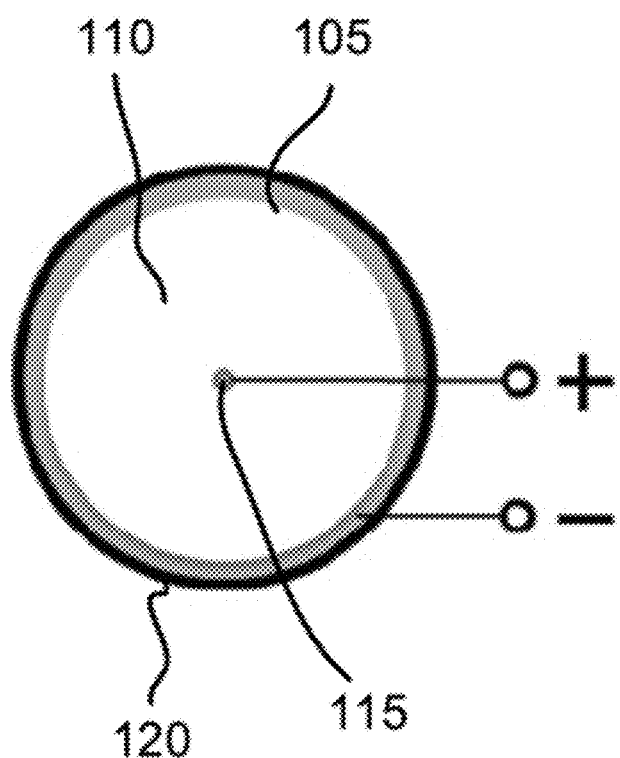
FIG. 3b illustrates a front cross-sectional view of a system for disinfecting fluid in accordance with some embodiments of the present disclosure.

As shown in FIGS. 3a and 3b, an exemplary embodiment provides a system for disinfecting a fluid 100. The system can comprise an outer electrode 105. In some embodiments, the outer electrode 105 can be cylindrically-shaped. The invention, however, is not so limited; rather, in some embodiments, the outer electrode 105 can have other shapes. The outer electrode 105 can define an internal cavity 110. In some embodiments, the outer electrode 105 can comprise a solid sheet of metal, or any other conductor or semiconductor. In some embodiments, however, the outer electrode 105 can comprise a plurality of electrodes that collectively form the cylindrical (or other) shape. The plurality of electrodes can be in electrical communication with each other, such that the voltage drop from one of the plurality of electrodes to another of the plurality of electrodes is substantially zero. The outer electrode 105 can comprise one or more metals or other conductors or semiconductors. The one or more metals can be any known conductor, such as copper.

The system can further comprise a body 120 surrounding the outer electrode 105. The body 120 can be many different shapes, including, but not limited to, cylindrical, rectangular, and the like. The body 120 can be made of many different materials. In an exemplary embodiment, the body 120 can comprise acrylic.

The system can further comprise a center electrode 115. The center electrode 115 can be positioned within the internal cavity 110. The center electrode 115 can also extend along at least a portion of a longitudinal axis of the outer electrode 105. In some embodiments, the center electrode 115 can extend along the entirety of the longitudinal axis of the outer electrode 105. The center electrode 115 can be in the form of a cylindrical wire. The center and outer electrodes can be coaxial with one another. The center electrode 115 can comprise one or more metals. The one or more metals can be selected from any known conductor, such as copper. It is understood that the center and outer electrodes need not comprise the same material, so long as both the center and outer electrodes comprise a conductive or semi-conductive material to allow an electric field to be created.

The center electrode 115 can have many different diameters, including, but not limited to, from 50 μm to 100 μm (e.g., from 55 μm to 95 μm, from 60 μm to 90 μm, from 60 μm to 90 μm, from 65 μm to 85 μm, or from 70 μm to 80 μm).

Figure 4A:
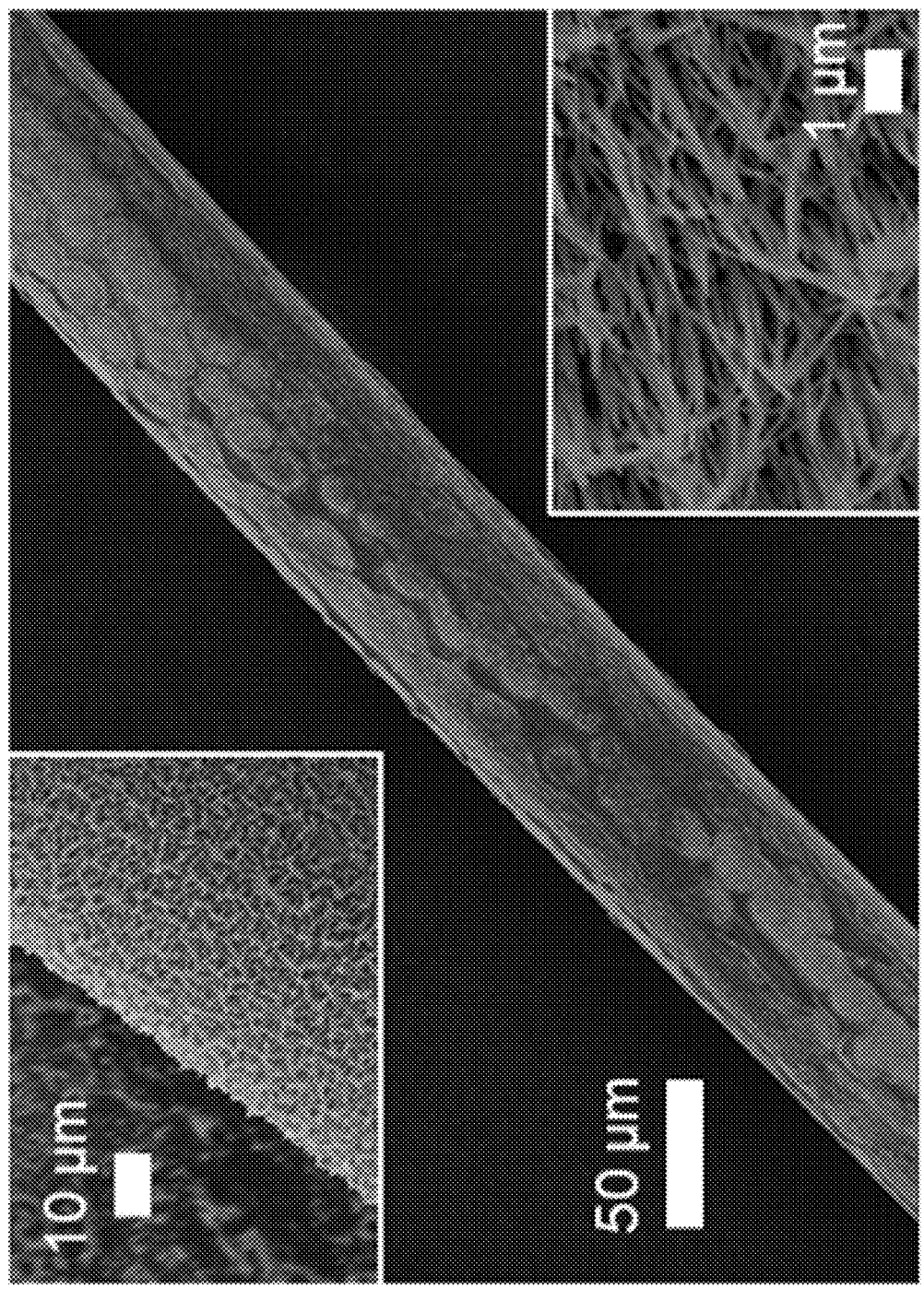
FIG. 4a illustrates a Scanning Electron Microscope (SEM) image of a center electrode in a system for disinfecting fluid in accordance with some embodiments of the present disclosure.

The center electrode 115 can comprise a plurality of surface area members disposed on a surface of the center electrode 115. The plurality of surface area members can extend outwardly from the surface of the center electrode 115 into at least a portion of the internal cavity 110. For instance, the plurality of surface area members can comprise nanowires disposed on the surface of the center electrode 115. Other surface area members can be included, such as a plurality of ribs, grooves, protrusions, flanges, and the like. Any combination of surface area members can be used as desired. FIG. 4a illustrates a center electrode 115. Zooming in to FIG. 4b, the plurality of surface area members can be seen disposed on the surface of the center electrode 115. By way of this example, the plurality of surface area members comprises nanowires.

The center electrode 115 can further comprise an exterior coating to encase the surface of the center electrode 115. The exterior coating can also be configured to protect the plurality of surface area members from damage and prevent the center electrode 115 from corrosion or other chemical reactions. The exterior coating can comprise a polymer or other similar material to protect the center electrode 115 without causing additional reactive activity. For instance, the exterior coating can comprise polydopamine because polydopamine is nonconductive. As would be appreciated, the protection of the center electrode 115 can greatly increase the durability and lifespan of such systems.

Figure 5:
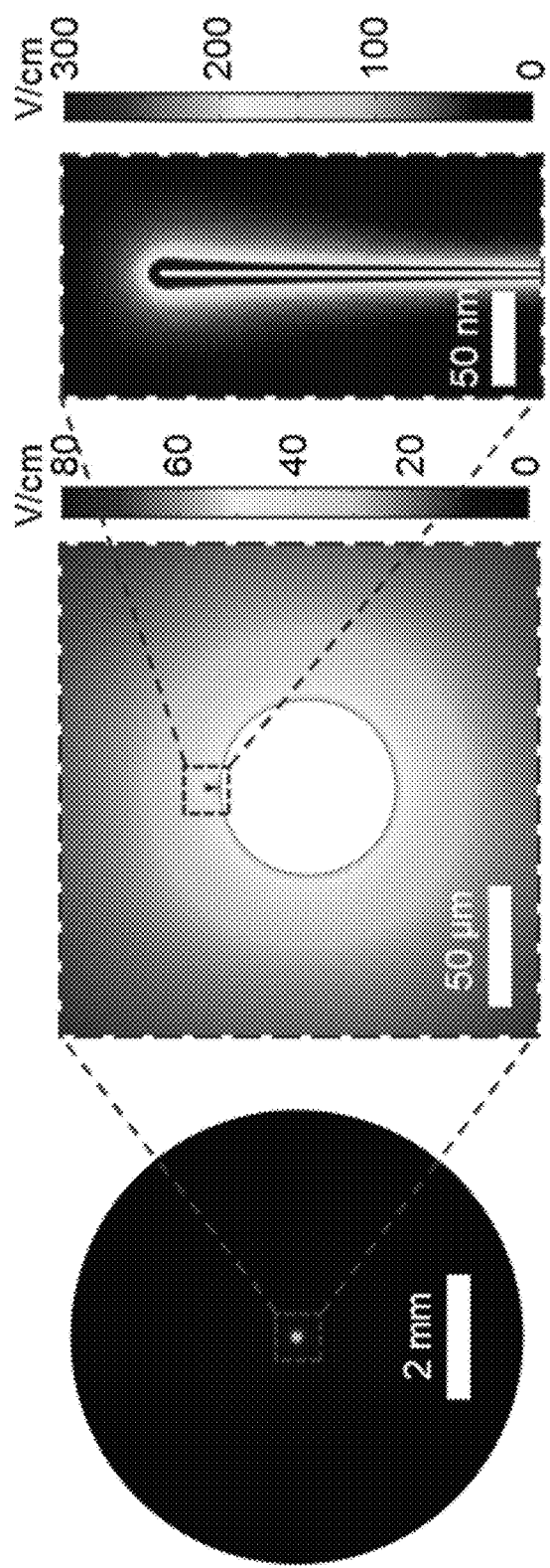
FIG. 5 illustrates an electric field simulation on a cross-sectional view of a system for disinfecting fluid in accordance with some embodiments of the present disclosure.

Attributed to the rational design, such examples in which the center electrode 115 and outer electrode 105 are coaxial, and the center electrode 115 includes a plurality of surface area members (such as nanowires), can enable two levels of electric field enhancement. As shown in the simulation results in FIG. 5, the electric field can first be enhanced because of the layout of the coaxial electrodes. The electric field strength near the surface of the center electrode 115 can be higher than that near the inner surface of the cylindrical outer electrode 105. The enhancement factor (f) is determined by the geometry of the device and can be calculated by Equation (1):

$$f = \frac{R}{r} \cdot \frac{1}{\ln\frac{r}{R}} \quad (1)$$

where R and r are the radii of the outer and center electrode, respectively. Higher enhancement effect can be achieved by reducing the diameter of the center electrode. For example, a center electrode equipped with a 76 μm diameter can have an enhancement factor of about 26. A second level of electric field enhancement can be implemented due to the effect of the surface area members. Using nanowires as an example, a "lightning rod" effect can be achieved to increase the strength of the electric field near the center electrode. With such two levels of enhancement, the electric field strength near the center electrode can be high enough for irreversible electroporation, even when the applied voltage is as low as 1 V, as illustrated in FIG. 5.

Since the high-strength electric field can be concentrated in the vicinity of the surface area members on the center electrode, operation of the disclosed systems can be configured to send bacterial cells to these areas, namely, the surface of the center electrode. Although the electroporation process can be trigged by a strong electric field in a few microseconds, a slow enough flow rate, or a long residence time, can improve the transportation of the bacterial cells. Considering that most bacterial cells are negatively charged in water with neutral pH, the center electrode can be set as the positive electrode so that the electrophoresis force can drive the cells towards the center of the device. Reversing the direction of the electric field can significantly reduce the inactivation efficiency. The dielectrophoretic force can also play an important role in delivering the cells. Because the conductivity of the bacterial cytoplasm is usually higher than that of the water matrix, the dielectrophoretic force directs the cells towards where the electric field strength is higher, which is the center of the device. As would be appreciated, the dielectrophoretic force can be an intrinsic force acting on the individual bacterial particles. The electric field can induce a charge distribution on the particles further drawing the particles to the positively charged center.

The system can further comprise and inlet 125 and an outlet 130. The inlet 125 can be positioned at a first end of the outer electrode 105, and the outlet 130 can be positioned at a second end of the outer electrode 105. The inlet 125 and outlet 130 can be used to direct fluid from an area external to the system, into the inlet 125, through the internal cavity 110, and out of the outlet 130. For example, the inlet 125 can be connected to a water source and can receive contaminated water. The contaminated water can enter the system through the inlet 125 where it becomes disinfected as it moves through the internal cavity 110 before exiting the outlet 130.

The system can also comprise a voltage supply, the voltage supply can be many different voltage supplies known in the art, including, but not limited to, one or more batteries, voltage from the utility grid, an electric generator, and the like. The voltage supply can be configured to apply a voltage across the center and outer electrodes. The voltage can generate a non-uniform electric field distribution on a cross-sectional plane of the system.

Figure 6:
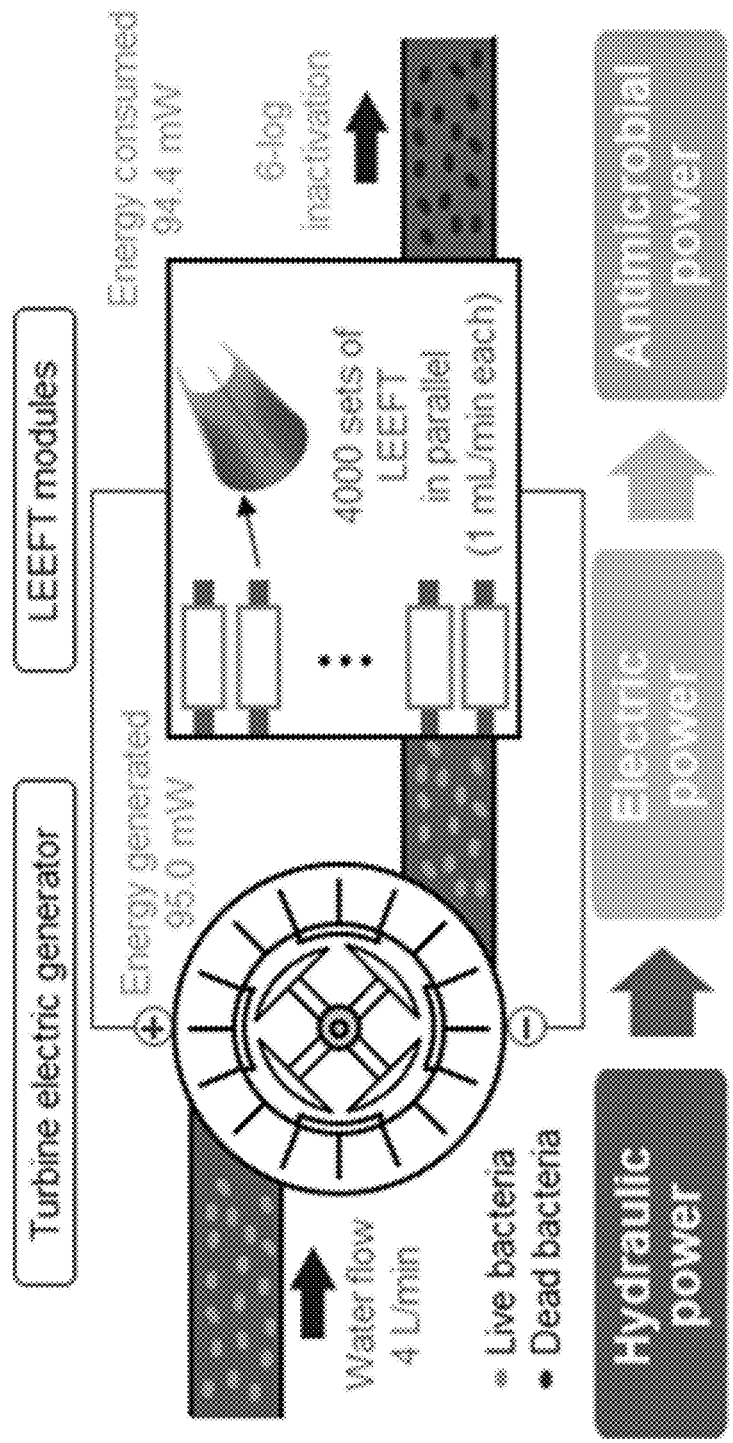
FIG. 6 illustrates a component diagram of a system for disinfecting fluid in accordance with some embodiments of the present disclosure.

The systems of the present disclosure can present a chemical-free process and operate solely on electricity. Although the energy consumption is low, having reliable access to electricity is desirable. To drive such systems in pipelines, the most convenient and economic way can be obtaining electricity from the power grid, which is usually close to the water grid. Another option can be to harvest the kinetic energy directly from the flowing water in the pipes and convert it to electricity. For example, an electromagnetic generator can be attached to the system, and the generator can have a rotor connected with water impellers, as shown in FIG. 6. When water is flowing through the turbine electric generator with a flowrate of 4 L/min, for example, the power output can be about 95 mW with a voltage of 5 V and a current of 19 mA. The power generated is enough to drive ~4000 sets of the prototype LEEFT devices treating water at a flowrate of 1 mL/min each. Thus, the total treatment speed can be about 4 L/min, which is in line with the flow rate applied for the electricity generation. Such flow rate match suggests the feasibility of powering LEEFT in pipelines without external energy sources.

The voltage applied to the system can be from 1V to 5V (e.g., from 1V to 4V, from 1V to 3V, from 1V to 2V, from 2V to 4V, from 3V to 4V, from 2.5V to 3.5V, from 1.5V to 4.5V, or from 1.5V to 2.5V). The voltage can also be supplied in different waveforms, such as an oscillation, a pulse, a decay, an impulse, and the like. For instance, the voltage can be supplied in a pulse having a frequency of $10^5$ Hz (on for 5 μs and off for 5 μs). The voltage applied to the system can be in DC or AC form.

As fluid flows from the inlet 125 to the outlet 130, the fluid can have a retention time (or residence time) within the system. The retention time can be controlled to ensure the fluid spends a sufficient amount of time in the system to be properly disinfected. Such a retention time can also be referred to as a hydraulic retention time. The fluid can have a hydraulic retention time of from 5 minutes to 15 minutes (e.g., from 6 minutes to 14 minutes, from 7 minutes to 13 minutes, from 8 minutes to 12 minutes, or from 9 minutes to 11 minutes). The hydraulic retention time can also be about 10 minutes. As hydraulic retention time can depend on the flow rate of the fluid and the length of the system, both flow rate and length can be altered to achieve a desired retention time.

Figure 7A:
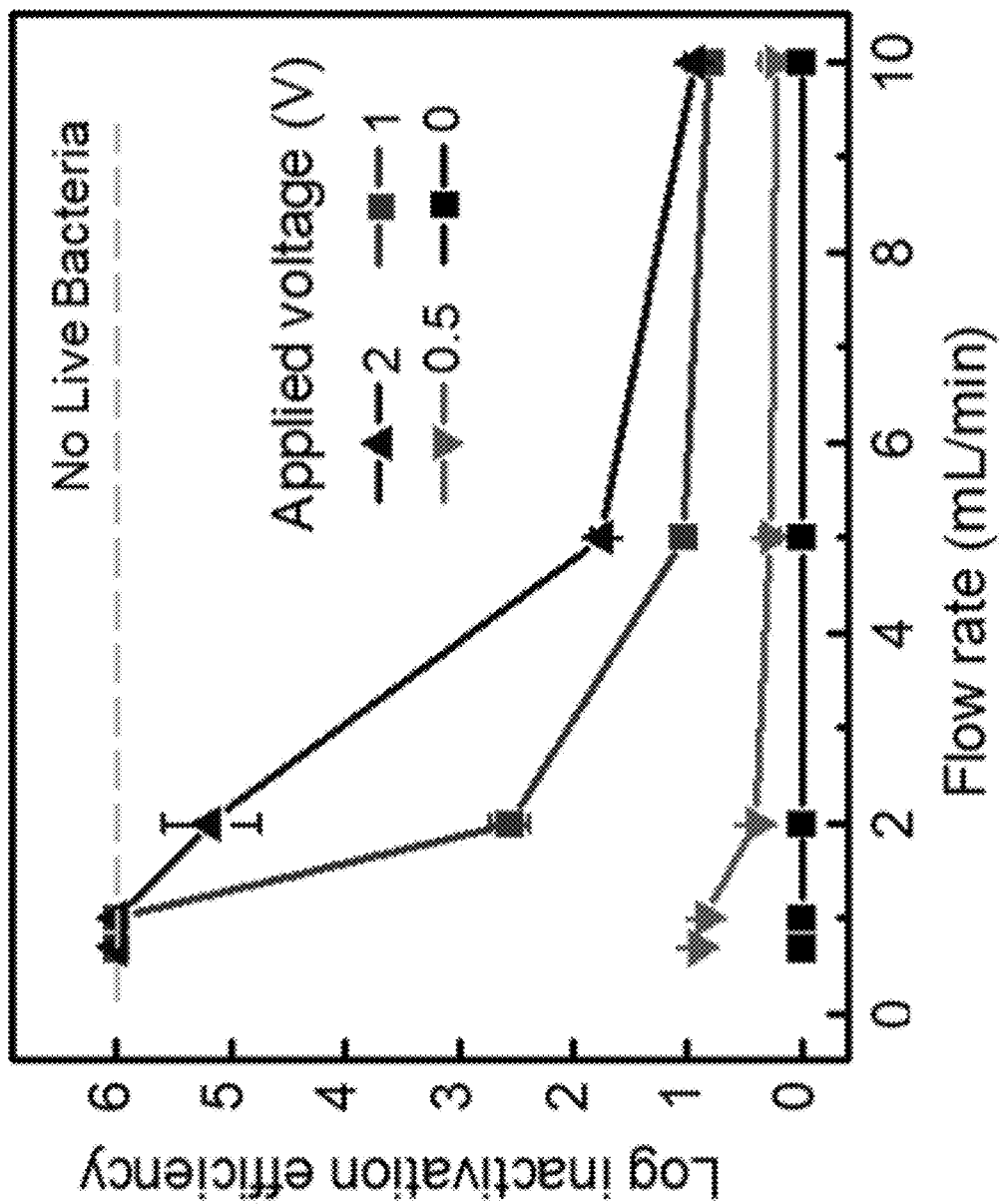
FIG. 7a illustrates a chart of the inactivation efficiency of some embodiments of the present disclosure.
Figure 7B:
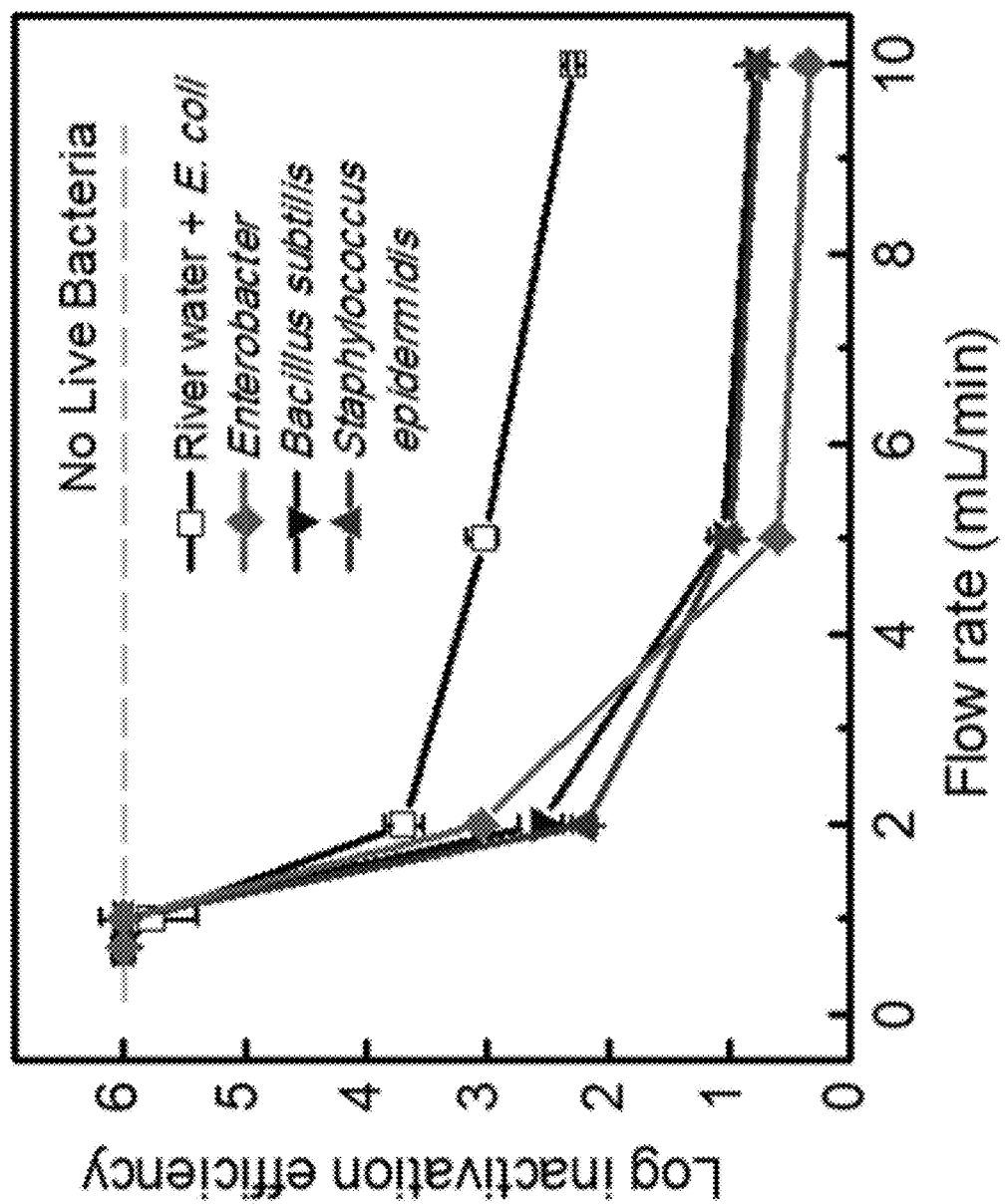
FIG. 7b illustrates another chart of the inactivation efficiency of some embodiments of the present disclosure.

When applying a voltage to the fluid under a hydraulic retention time, the fluid can have an inactivation efficiency upon exiting the outlet 130. The inactivation efficiency can be calculated using a log scale. At any particular retention time and voltage, the fluid can have an inactivation efficiency of log 1 or greater (e.g., log 1.5 or greater, log 2 or greater, log 2.5 or greater, log 3 or greater, log 3.5 or greater, log 4 or greater, log 4.5 or greater, log 5 or greater, log 5.5 or greater, log 6 or greater, log 6.5 or greater, or log 7 or greater). The fluid can alternatively have an inactivation efficiency from log 1 to log 7 (e.g., from log 1.5 to log 7, from log 2 to log 7, from log 2.5 to log 7, from log 3 to log 7, from log 3.5 to log 7, from log 4 to log 7, from log 4.5 to log 7, from log 5 to log 7, from log 5.5 to log 7, from log 6 to log 7, or from log 6.5 to log 7). By way of illustration, FIG. 7a illustrates the inactivation efficiency of a sample when ran through the system at various flow rates (retention times) and applied voltages. FIG. 7b, alternatively illustrates the inactivation efficiency under a fixed 1V applied voltage for various flow rates and bacterial contaminants.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 8:
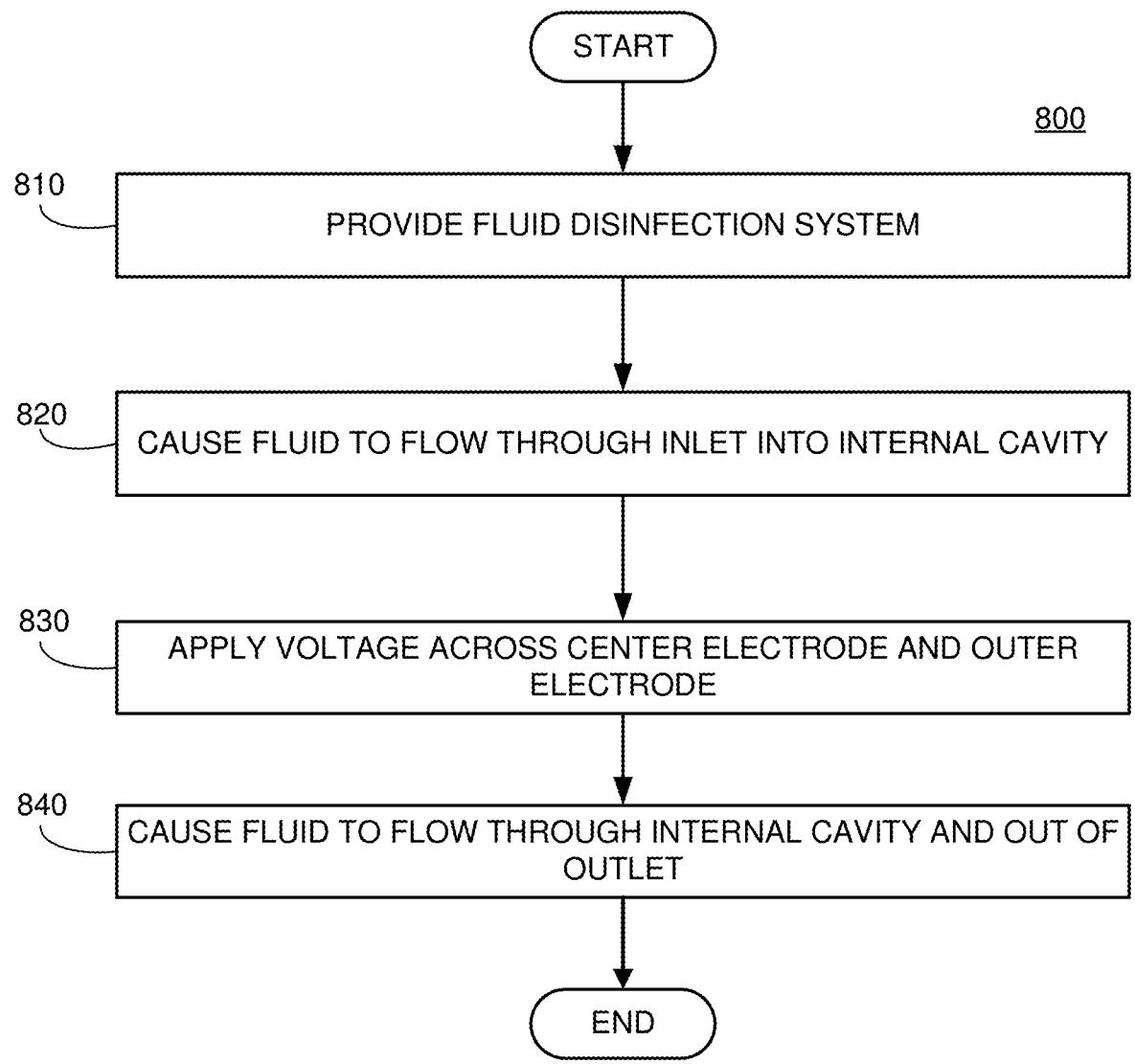
FIG. 8 illustrates a flowchart of an example method for disinfecting a fluid in accordance with some embodiments of the present disclosure.

FIG. 8 illustrates a flowchart of an exemplary method 800 for disinfecting a fluid. As shown in block 810, the method 800 can provide a fluid disinfection system as described in the present disclosure. The fluid disinfection system can comprise an outer electrode defining an internal cavity, a center electrode comprising a plurality of surface area members, the center electrode positioned within the internal cavity and extending along at least a portion of a longitudinal axis of the outer electrode, an inlet positioned proximate a first end of the outer electrode and in fluid communication with the internal cavity, and an outlet positioned proximate a second end of the outer electrode and in fluid communication with the internal cavity. The method 800 can then proceed to block 820.

In block 820, the method 800 can cause a fluid to flow through the inlet into the internal cavity. The fluid can comprise at least one living contaminant at a first concentration upon entering the inlet. The at least one living contaminant can be, for example, bacteria. The method 800 can then proceed to block 830.

In block 830, the method 800 can apply a voltage across the center electrode and the outer electrode, as described in the present disclosure. The voltage can generate a non-uniform electric field distribution on a cross-sectional plane of the fluid disinfection system. As described above, the voltage can be from 1V to 5V. The method 800 can then proceed to block 840.

In block 840, the method 800 can cause the fluid to flow through the internal cavity and out of the outlet. The fluid flowing out of the outlet can have a second concentration of the living contaminant, and the second concentration can be less than the first concentration of living contaminant. The reduction in living contaminant from the first concentration to the second concentration can be characterized by the inactivation efficiency of the fluid. The inactivation efficiency can be from log 5 to log 7. In some embodiments, method 800 may terminate and complete after block 840. However, in other embodiments, the method may continue on to other method steps not shown.

Certain embodiments and implementations of the disclosed technology are described above with reference to block and flow diagrams of systems and methods according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

EXEMPLARY USE CASES

The following examples are provided by way of illustration but not by way of limitation.

An exemplary embodiment will now be described in the form of a LEEFT system for disinfecting a fluid. A coaxial-electrode LEEFT device can be composed of a hollow cylinder as the outer electrode, a coaxial wire in the center of the cylinder cross-section serving as the center electrode, and a reactor holder for assembling. The outer electrode can be a copper cylinder (interior diameter, 0.95 cm; length, 12.7 cm), while the center electrode can be a fine wire (diameter, 76 µm; length, 12.7 cm) with nanowires modified. For the scaled-up reactor, a commercially available aluminum tube (interior diameter, 0.77 cm; length, 183 cm) can be used as the outer electrode. A 183-cm-long center electrode wire (diameter, 76 µm) can be fabricated using the same procedure of the one in the prototype reactor. Similar acrylic reactor holder is used to assemble the parts together.

The fine copper wire serving as the center electrode can be modified with copper oxide nanowires (CuONWs). Specifically, after being washed with HCl solution (1 M) and rinsed with DI water to remove the oxidation layer, the copper wire can be heated at 400° C. in air for 2 hours and let cool down to the room temperature, which allowed CuONWs to grow perpendicular to the electrode surface. Subsequently, the prepared CuONW-Cu wire can be immersed into a dopamine solution buffered with Tris (0.01 mol/L, pH 8.5) under 40° C. to be coated with a polydopamine protection layer. After the coating process, the electrodes can be gently washed with DI water, dried in the air, and ready to use.

The morphology of the center electrode can be characterized with a scanning electron microscope (Zeiss Ultra60 SEM) and a transmission electron microscope (Hitachi HT-7700 TEM). The length and diameter of the nanowires can be measured on the SEM and TEM images and used for the electric field analysis.

Four strains of model bacteria, *Escherichia coli* (*E. coli*, 10798), *Enterobacter hormaechei* (700323), *Bacillus subtilis* (6051), and *Staphylococcus epidermidis* (14990), can be purchased from the American Type Culture Collection (ATCC) and used for the bacterial inactivation experiments. The model bacteria can be cultured aerobically in the according broth media at 35° C. to log phase (6-12 hours). The bacteria solution can then be centrifuged at 5000 rpm for 5 min and washed using DI water for three times to remove the potential interference of the background media. The harvested bacteria solution can be diluted with DI water to a concentration of ~1×10$^7$ colony-forming units (CFU)/mL. During the inactivation experiments, the bacterial solution can be flowed through the LEEFT device with a fixed flow rate (0.7 to 10 mL/min). Different waveforms of the voltage can be applied between the positive and negative electrodes. The direct-current (DC) voltages (0-2 V) can be created by a Keithley 2400 Sourcemeter and the square wave pulses can be generated by a Keysight 33500B Waveform Generator. The waveform parameters controlled can include frequency (10$^5$ Hz), lead edge (8.4 ns), trail edge (8.4 ns), high voltage (1 V), and low voltage (0 V). The current during DC operation can be measured by the Sourcemeter and recorded at the sampling point. The river water matrix can first be filtered with a membrane (0.2 µm diameter) and then dosed with *E. coli* of ~10$^7$ CFU/mL. The bacterial concentration ($c_{in}$ for influent and car for effluent) can be measured using the spread plating technique and the inactivation efficiencies were calculated by Equation (2):

$$\text{Log inactivation efficiency} = -\log_{10}\left(\frac{c_{\mathit{eff}}}{c_{in}}\right) \qquad (2)$$

The effluent copper concentration can be measured. After being collected and acidified with $HNO_3$ (2% w/w) solution, the water samples can be analyzed by the Copper Test Kit (HACH, porphyrin method 8143) with a HACH DR6000 spectrophotometer.

The electric field distribution can be simulated by finite element method using COMSOL Multiphysics. A 3D model of the chamber can be set up, and a single nanowire can be built to demonstrate the electric field around the tip area. Electrostatic module can be used for the simulation, where the electric field was defined by Equation (3).

$$E=-\nabla V \quad (3)$$

where V was the electric potential. The values used for the simulation represented the real configuration and operation condition of the prototype LEEFT device.

Water samples can be collected before and after the disinfection process (voltage, 1 V; flow rate, 1 mL/min). After being added the same amount of PI dye (10 μL, 3 μM), the samples (1 mL) can be stored in the dark for 1 hour and then rinsed with DI water to wash off the extra dye. Subsequently, the stained samples an be examined by an Axio Observer 7 Inverted Live-Cell Research Microscope under both florescence and differential interference contrast (DIC) modes.

Figure 9:
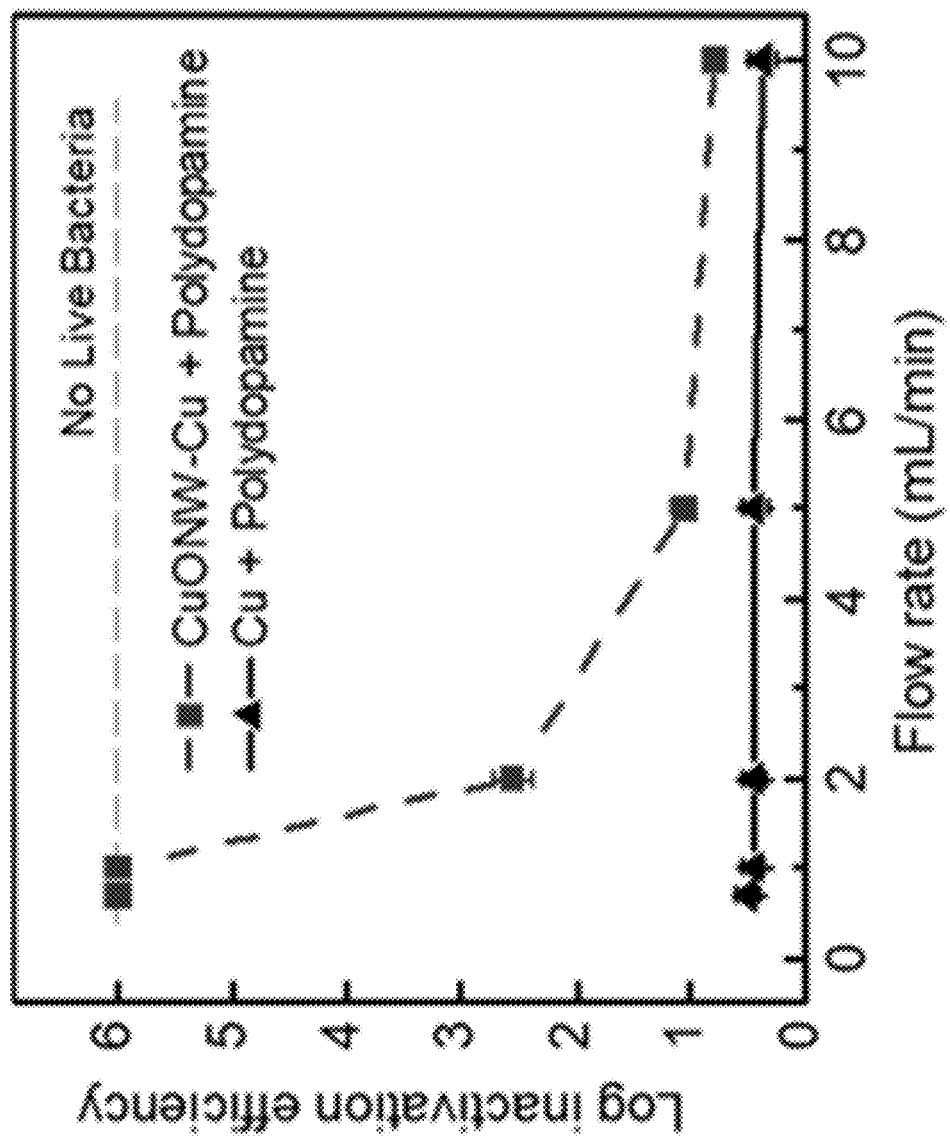
FIG. 9 illustrates a chart of the inactivation efficiency of some embodiments of the present disclosure.

As shown in FIG. 7a, when the prototype LEEFT device is applied to treat water samples containing $10^7$ CFU/mL $E.$ $coli$, over 6 logs bacterial inactivation (no living bacteria detected in the effluent) can be achieved with an applied voltage larger than 1 V and a flow rate lower than 1 mL/min. Under the operation of 1 mL/min flow rate and 1 V DC voltage, the copper concentration in the treated water can be ~24 μg/L, a concentration that is too low to cause significant antimicrobial effect. Meanwhile, the level of copper concentration can be much lower than the maximum contaminant level goal (MCLG) of 1.3 mg/L set by U.S. Environmental Protection Agency for drinking water. The high inactivation efficiency (~5.6 logs) can still be maintained when a pulsed voltage with a high frequency of $10^5$ Hz (on for 5 us and off for 5 μs) rather than a DC voltage is applied to power the LEEFT. At such a high frequency, the electrochemical reactions (e.g., oxidation of Cu and surface acidification on the positive electrode; production of $H_2$ and deposition of metal ions on the negative electrode) can largely be eliminated, which rules out the microbial inactivation contributed by direction oxidation and electrochemically-generated reactive oxygen species. The inactivation efficiency can be negligible when no voltage is applied, which suggests few bacterial cells stick on the surface of the electrodes. Control experiments using a polydopamine coated copper wire as the center electrode show no significant bacterial inactivation, as shown in FIG. 9, indicating that the nanowire structure can aid the disinfection process and the antimicrobial effect of polydopamine can be neglected. Thus, nanowire enabled irreversible electroporation can be the main mechanism for microbial inactivation.

Figure 10:
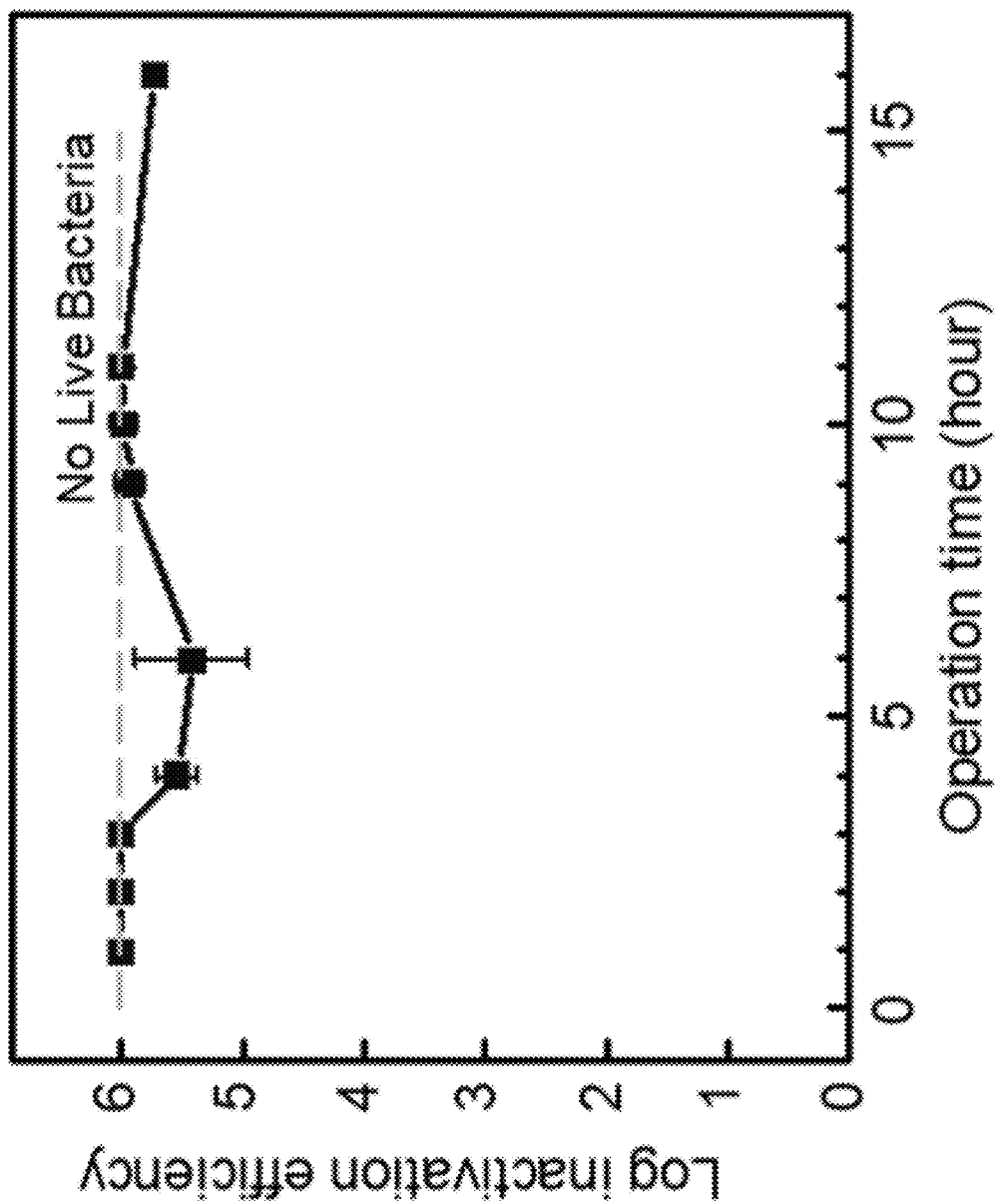
FIG. 10 illustrates a chart of the inactivation efficiency over a long-term operation time in accordance with some embodiments of the present disclosure.

When the LEEFT is performed at 1 V and the flow rate is 1 mL/min, the electric current during the operation can be ~24 μA. Thus, the energy consumption can be estimated to be as low as 1.4 J/L, similar to that of previous LEEFT devices. Under the same operating condition (1 V and 1 mL/min), the prototype device can treat water continuously for 16 hours. As shown in FIG. 10, the inactivation efficiency can remain higher than 5 logs with slight fluctuation throughout the testing period, indicating the high stability and reliability of the treatment. A good number of nanowires can still exist after 16 hours operation, while the disinfection efficiency maintains high.

The coaxial-electrode LEEFT prototype device can also perform well to kill other bacteria, including both gram-negative ($G^-$) and gram positive ($G^+$) bacteria. As shown in FIG. 7b, similar to $E.$ $coli$ ($G^-$), all the other three bacteria tested, $Enterobacter$ $hormaechei$ ($G^-$), $Bacillus$ $subtilis$ ($G^+$), and $Staphylococcus$ $epidermidis$ ($G^+$), can be effectively inactivated (>6 logs), when the applied voltage is larger than 1 V and the flow rate is 1 mL/min. FIG. 7b also shows the inactivation efficiency when applying the prototype device to treat a natural river water sample that has been dosed with $E.$ $coli$. The properties of the river water tested are shown below in Table 1.

TABLE 1

| Water quality characteristics of river water | |
|---|---|
| Parameter | Value |
| Water source | Chattahoochee River, GA, USA |
| Location | 33.902N, 84.444W |
| Sampling date | Dec. 2, 2018 |
| pH | 6.86 |
| Conductivity | 61.8 μs/cm |

The results suggest that bacterial inactivation can slightly affected by the property of the water matrix. Nevertheless, the impact is not significant, and high inactivation efficiency is still achievable.

When a scaled-up LEEFT device with a much longer treatment chamber is applied for water disinfection, higher water treatment throughputs can be achieved. The flowrate can be increased to 6.0 mL/min while maintaining the high inactivation efficiency (>6 logs) with the same low voltage (1 V) applied. Such results can indicate the great scalability of the coaxial-electrode LEEFT devices.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A low voltage electroporation disinfection system for disinfecting a fluid comprising:
   a non-porous outer electrode having an inner surface at an inner diameter D and defining an internal cavity and at least a portion of a flow path in a flow path direction;
   a non-porous center electrode positioned coaxially within the internal cavity and having an outer surface at an outer diameter d and comprising surface area members, the center electrode extends within the flow path along at least a portion of a longitudinal axis of the outer electrode;
   a voltage supply configured to:
      supply a voltage across the outer electrode and center electrode via an electrical current in a current path direction; and
      generate a non-uniform electric field distribution on a cross-sectional plane of the system;
   a flow path inlet positioned proximate a first end of the outer electrode and configured to allow a fluid to pass from an area external to the internal cavity into the internal cavity; and
   a flow path outlet positioned proximate a second end of the outer electrode and configured to allow the fluid to pass from the internal cavity into an area external to the internal cavity;
   wherein the flow path direction is perpendicular to the current path direction;
   wherein an enhancement factor of electric field f is defined as:

$$F = \left(\frac{D}{d}\right) \cdot \frac{1}{\ln\left(\frac{D}{d}\right)};$$

wherein the surface area members comprise copper oxide nanowires (CuONW) with a polydopamine (PDA) thin-layer coating configured to enhance the center electrode stability and reduce copper release into the fluid;
   wherein the system provides for electric field enhancement via:
      the coaxial arrangement of the center electrode with the surface area members within the outer electrode; and
      the increase in f with a reduction of the outer diameter d of the center electrode, which leads to an attendant increase in a gap distance defined between the outer surface of the center electrode and the inner surface of the outer electrode; and
   wherein the outer electrode, center electrode, voltage supply, flow path inlet, and flow path outlet are configured to cooperatively limit the fluid flow through the internal cavity with a hydraulic retention time sufficient to reduce a living contaminant in the fluid at an inactivation efficiency of log 1 or greater.

2. The system of claim 1, wherein the center electrode is a solid rod; and
   wherein the voltage supply is configured to supply an applied voltage of less than 5V.

3. The system of claim 1, wherein the voltage is DC voltage.

4. The system of claim 1, wherein the outer electrode and the center electrode comprise a metal; and
   wherein the inactivation efficiency is from log 5 to log 7.

5. The system of claim 1, wherein the diameter d is from 50 µm to 100 µm; and
   wherein the voltage supply is further configured to supply a non-pulsed voltage.

6. The system of claim 1, wherein the diameter d is from 70 µm to 80 µm; and
   wherein the voltage supply is further configured to supply a fixed voltage.

7. The system of claim 1, wherein the outer electrode and the center electrode are cylindrically shaped.

8. The system of claim 1, wherein the voltage supply is configured to supply a voltage from 1V to 2V across the outer electrode and center electrode; and
   wherein the hydraulic retention time is about ten minutes.

9. A low voltage electroporation disinfection system for disinfecting a fluid comprising:
   a coaxial-electrode electroporation disinfection cell (CEEDC) comprising:
      a hollow cylindrical non-porous outer electrode having an inner surface at an inner diameter D comprising copper and defining an internal cavity; and
      a non-porous center electrode comprising a wire coaxially positioned within the internal cavity of the outer electrode, the center electrode having an outer surface at an outer diameter d comprising a plurality of metallic nanowires having tips;
      wherein an annular gap is defined between the inner surface of the outer electrode and the outer surface of the center electrode; and
      wherein a fluid can pass through the internal cavity in a flow path direction with a hydraulic retention time; and
   a voltage supplier comprising a turbine electric generator, the turbine electric generator in communication with the fluid and configured to:
      supply a voltage across the outer electrode and center electrode via an electrical current in a current path direction;
      generate a non-uniform electric field distribution on a cross-sectional plane of the system; and
      enable irreversible electroporation in proximity of the tips of the metallic nanowires;
   such that when the fluid is permitted to flow through the internal cavity with the hydraulic retention time, the supplied voltage is sufficient to reduce a living contaminant in the fluid at an inactivation efficiency of log 1 or greater;
   wherein an enhancement factor of electric field f is defined as:

$$F = \left(\frac{D}{d}\right) \cdot \frac{1}{\ln\left(\frac{D}{d}\right)};$$

wherein the system provides for a two part electric field enhancement via:
      the CEEDC cell providing the coaxial arrangement of the center electrode with metallic nanowires within the outer electrode; and
      the increase in f with a reduction of the outer diameter d of the center electrode, which leads to an attendant increase in the annular gap; and
   wherein the flow path direction is perpendicular to the current path direction.

10. The system of claim 9, wherein the plurality of metallic nanowires comprise copper oxide nanowires (CuONW) with a polydopamine (PDA) thin-layer coating configured to enhance the center electrode stability and reduce copper release into the fluid.

11. The system of claim 9, wherein the outer diameter d is of from 50 μm-100 μm; and
wherein the plurality of metallic nanowires have an average diameter of ~100 nm and an average length of ~3.5 μm.

12. The system of claim 9, wherein when the system is supplied with an applied voltage of ~1V;
the electric field strength in proximity of the outer surface of center electrode is ~80 V/cm; and
the electric field strength in proximity of the tips of the metallic nanowires extending from the outer surface of the center electrode is ~3000 V/cm.

13. A flow-by reactor for disinfecting a fluid comprising:
a non-porous outer electrode having an inner surface at a diameter D and defining an internal cavity;
a non-porous center electrode having an outer surface at al diameter d of from 50 μm to 100 μm positioned concentrically within the internal cavity and extending along at least a portion of a longitudinal axis of the outer electrode, the center electrode having a surface comprising a plurality of copper nanowires;
an inlet positioned proximate a first end of the outer electrode and configured to allow a fluid to pass from an area external to the cavity into the cavity;
an outlet positioned proximate a second end of the outer electrode and configured to allow the fluid to pass from the cavity into an area external to the cavity; and
a voltage supplier in communication with the fluid and configured to supply a voltage across the outer electrode and center electrode;
wherein the voltage:
is selected from the group consisting of DC, AC and combinations thereof;
is supplied in one or more waveforms selected from the group consisting of oscillation, pulse, decay, impulse, and combinations thereof; and
generates a non-uniform electric field distribution on a cross-sectional plane of the flow-by reactor; and
wherein an enhancement factor of electric field f is defined as:

$$F = \left(\frac{D}{d}\right) \cdot \frac{1}{\ln\left(\frac{D}{d}\right)};$$

wherein the reactor provides for electric field enhancement via:
the concentric arrangement of the center electrode with the copper nanowires within the outer electrode; and
the increase in f with a reduction of the outer diameter d of the center electrode, which leads to an attendant increase in a gap distance defined between the outer surface of the center electrode and the inner surface of the outer electrode; and
wherein f is 26.

14. A method for disinfecting a fluid comprising:
providing the fluid disinfection system of claim 1;
causing a fluid to flow through the flow path inlet and into the internal cavity, the fluid comprising at least one living contaminant at a first concentration upon entering the flow path inlet;
applying the voltage across the center electrode and the outer electrode; and
causing the fluid to flow through the internal cavity with the hydraulic retention time and out of the flow path outlet;
wherein a second concentration of the living contaminant upon exiting the flow path outlet is less than the first concentration such that the inactivation efficiency of log 1 or greater is provided by the method.

15. The method of claim 14, wherein the outer electrode and the center electrode comprise a metal.

16. The method of claim 14, wherein the second concentration of the living contaminant is reduced from the first concentration at an inactivation efficiency from log 5 to log 7.

17. The method of claim 16, wherein the inactivation efficiency is about log 6.

* * * * *